US012243286B2

(12) United States Patent
Song et al.

(10) Patent No.: US 12,243,286 B2
(45) Date of Patent: Mar. 4, 2025

(54) PATTERN IMAGE DETECTION METHOD (71) Applicant: Fourth Logic Incorporated, Gyeonggi-do (KR)

(72) Inventors: Jong Hyun Song, Gyeonggi-do (KR); Kang Cho, Seoul (KR)

(73) Assignee: Fourth Logic Incorporated, Gyeonggi-do (KR)

( * ) Notice: Subject to any disclaimer, the term of this patent is extended or adjusted under 35 U.S.C. 154(b) by 412 days.

(21) Appl. No.: 17/726,485

(22) Filed: Apr. 21, 2022

(65) Prior Publication Data

US 2023/0005242 A1 Jan. 5, 2023

(30) Foreign Application Priority Data

Jun. 11, 2021 (KR) .................. 10-2021-0075951

(51) Int. Cl.
G06V 10/74 (2022.01)
G06T 7/00 (2017.01)

(52) U.S. Cl.
CPC ............ G06V 10/761 (2022.01); G06T 7/001 (2013.01); *G06T 2207/30148* (2013.01)

(58) Field of Classification Search
None
See application file for complete search history.

(56) References Cited

U.S. PATENT DOCUMENTS

| | | | | |
|---|---|---|---|---|
| 5,359,513 A | * | 10/1994 | Kano | G06T 3/153 |
| | | | | 382/128 |
| 5,946,425 A | * | 8/1999 | Bove, Jr. | G06T 7/32 |
| | | | | 382/128 |
| 8,144,928 B2 | * | 3/2012 | Ohba | G08B 13/196 |
| | | | | 382/165 |
| 8,422,793 B2 | | 4/2013 | Iwamura et al. | |
| 8,867,836 B2 | * | 10/2014 | Warfield | G06T 7/32 |
| | | | | 382/128 |
| 9,105,306 B2 | | 8/2015 | Ishikawa | |
| 10,332,259 B2 | * | 6/2019 | Nishiyama | G06T 7/11 |
| 11,145,033 B2 | * | 10/2021 | Derndinger | G06T 5/10 |
| 11,328,442 B2 | * | 5/2022 | Nakamura | G06T 7/70 |
| 11,425,353 B1 | * | 8/2022 | Konolige | H04N 13/111 |

(Continued)

FOREIGN PATENT DOCUMENTS

| | | |
|---|---|---|
| JP | 2012226616 | 11/2012 |
| KR | 102188991 | 12/2020 |

OTHER PUBLICATIONS

Shen, Yiping, et al. "Ordering pixels for fast ZNCC template matching." 2013 IEEE International Conference of IEEE Region 10 (TENCON 2013). IEEE, 2013. (Year: 2013).*

(Continued)

*Primary Examiner* — Michelle M Entezari Hausmann
(74) *Attorney, Agent, or Firm* — JCIPRNET (57) ABSTRACT Provided are a method and apparatus for detecting a pattern image, and more particularly, a pattern image detection method and a pattern image detection apparatus for effectively detecting a pattern of a template image from a target image. The pattern image detection method and the pattern image detection apparatus can provide an effect of quickly and accurately detecting the pattern of the template image from the target image while reducing the amount of computation for detecting the pattern of the template image.

9 Claims, 9 Drawing Sheets

(56) References Cited

U.S. PATENT DOCUMENTS

| | | | |
|---|---|---|---|
| 11,436,742 B2* | 9/2022 | Sinha | G06V 10/751 |
| 11,593,755 B2* | 2/2023 | Bogolea | H04N 25/61 |
| 11,657,477 B2* | 5/2023 | Yoshida | G06T 5/50 |
| | | | 382/284 |
| 2004/0189674 A1* | 9/2004 | Zhang | H04N 1/195 |
| | | | 345/629 |
| 2016/0042242 A1* | 2/2016 | Segawa | G06F 3/0304 |
| | | | 382/103 |
| 2021/0383524 A1 | 12/2021 | Dou et al. | |

OTHER PUBLICATIONS

Lin C, Li Y, Xu G, Cao Y. Optimizing ZNCC calculation in binocular stereo matching. Signal Processing: Image Communication. Mar. 1, 2017;52:64-73. (Year: 2017).*

Chantara, Wisarut, and Yo-Sung Ho. "Object searching with combination of template matching." Advances in Multimedia Information Processing—PCM 2015: 16th Pacific-Rim Conference on Multimedia, Gwangju, South Korea, Sep. 16-18, 2015, Proceedings, Part I 16. Springer International Publishing, 2015. (Year: 2015).*

Kawanishi, Takahito, et al. "A fast template matching algorithm with adaptive skipping using inner-subtemplates' distances." Proceedings of the 17th International Conference on Pattern Recognition, 2004. ICPR 2004.. vol. 3. IEEE, 2004. (Year: 2004).*

Sahani, Sanjav Kumar, and Manvendra Singh Chauhan. "A novel fast template matching algorithm based on bounded approach using block partitioning method." 2021 2nd International Conference on Range Technology (ICORT). IEEE, 2021. (Year: 2021).*

Chantara, Wisarut, and Yo-Sung Ho. "Object detection based on fast template matching through adaptive partition search." 2015 12th International Joint Conference on Computer Science and Software Engineering (JCSSE). IEEE, 2015. (Year: 2015).*

* cited by examiner

| | | | | A | | |
|---|---|---|---|---|---|---|
| 0 | 51 | 148 | 734 | 1177 | 1472 | 1528 |
| 0 | 50 | 136 | 661 | 1090 | 1374 | 1428 |
| 0 | (37) B | 111 | 515 | (877) | 1127 | 1169 |
| 0 | 22 | 68 | 305 | 525 | 687 | 716 |
| 0 | 11 | 33 | 146 | 255 | 336 | 347 |
| 0 | (1) D | 9 | 37 | (63) | 80 | 81 |
| 0 | 0 | 0 | 0 | 0 | 0 | 0 |
| | | | C | | | |

FIG. 4A

| 1 | 11 | 61 | 14 | 11 | 2 |
|---|---|---|---|---|---|
| 13 | 12 | 121 | 67 | 34 | 12 |
| 15 | 28 | 167 | 142 | 88 | 13 |
| 11 | 24 | 124 | 111 | 81 | 18 |
| 10 | 14 | 85 | 83 | 64 | 10 |
| 1 | 8 | 28 | 26 | 17 | 1 |

PATTERN IMAGE DETECTION METHOD

CROSS-REFERENCE TO RELATED APPLICATION

This application is based on and claims priority under 35 USC § 119 to Korean Patent Application No. 10-2021-0075951, filed on Jun. 11, 2021, in the Korean Intellectual Property Office, the disclosure of which is incorporated by reference herein in its entirety.

BACKGROUND

1. Field

The present disclosure relates to a method and apparatus for detecting a pattern image, and more particularly, to a pattern image detection method and a pattern image detection apparatus for effectively detecting a pattern of a template image from a target image.

2. Description of the Related Art

Searching for a pattern of a template image from a target image and identifying an accurate position of the pattern is a high-demand process in a variety of fields. For example, such a pattern detection method is widely used even in the case of placing a semiconductor chip on a semiconductor substrate, or finding a position of the chip or an object to perform additional operations on the placed chip.

Pixels constituting a digital image have properties independent of each other, and a plurality of pixels are disposed on a screen to display a specific shape (pattern). Each pixel is independent of the other pixels, but by grouping pixels connected adjacent to each other in the image into one group, a pattern and distribution of the image, which represents a constant shape, may represent a distributed characteristic that is correlated to each other.

In this case, a pattern of a template image may be detected from a target image by storing X and Y coordinates of each of the pixels in an array, which is secured by as much as the number of the pixels, of a memory, and comparing absolute positions and pixel values of all the pixels with each other and considering the positions of adjacent pixels together.

According to the conventional method, all the absolute positions and pixel values of the pixels have to be compared individually, and thus detection computation time is increased. In addition, each pixel value has camera's quantization noise, and thus a noise error is increased. In particular, when the size of the template image including the pattern image is large, the computation time is further increased. Thus, it is more difficult to process a large-capacity image at high speed.

SUMMARY

Additional aspects will be set forth in part in the description which follows and, in part, will be apparent from the description, or may be learned by practice of the presented embodiments of the disclosure.

According to an aspect of the present disclosure, there is provided a pattern image detection method in which a template image is compared with a target image and a pattern included in the template image is searched for from the target image, including (a) receiving the template image and the target image by a receiving module, (b) receiving a reference similarity that is a criterion for determining whether there is a similarity, a reference skip distance that defines a distance to a next comparison reference pixel in the target image, and a detailed search criteria that defines a range in which a detailed search is performed in the target image, by a receiving module, (c) dividing the template image into a plurality of regions having the same size by a template region module, (d) summing a square of a brightness value of each of pixels in each region of the template image and setting the sum as a brightness value for each region, by the template region module, (e) selecting a comparison reference pixel of the target image by a target region module, (f) selecting a comparison target area having the same size as the template image on the basis of the comparison reference pixel of the target image and dividing the comparison target area into a plurality of regions having the same size as the regions of the template image, by the target region module, (g) summing a square of a brightness value of each of pixels in each region of the comparison target area of the target image and setting the sum as a brightness value for each region, by the target region module, (h) performing a normalized cross-correlation calculation according to Equation 1 in units of regions on the brightness value for each region of the template image and the comparison target area of the target image to calculate a similarity between the template image and the comparison target area, by a similarity calculation module, $$R(u,v) = \frac{\sum_{Y=0}^{B_Y-1} \sum_{X=0}^{B_X-1} (T(X,Y) - E(T))(D_{u,v}(X,Y) - E(D_{u,v}))}{\sqrt{\sum_{Y=0}^{B_Y-1} \sum_{X=0}^{B_X-1} (T(X,Y) - E(T))^2} \sqrt{\sum_{Y=0}^{B_Y-1} \sum_{X=0}^{B_X-1} (D_{u,v}(X,Y) - E(D_{u,v}))^2}}$$ [Equation 1]

where, u: a position of the target image in a horizontal axis, v: a position of the target image in a vertical axis, X: a position of a region of the template image in the horizontal axis, Y: a position of a region of the template image in the vertical axis, W: a horizontal length of the template image, H: a vertical length of the template image, $B_X$: the number of regions of the template image in the horizontal axis, $B_Y$: the number of regions of the template image in the vertical axis, T: the entire region of the template image, $D_{u,v}$: the entire comparison region of the target image, $I_T(x,y)$: a brightness value of an x, y position of the template image, $I_D(x,y)$: a brightness value of an x, y position of the target image, $$T(X,Y) = \sum_{y=Y\frac{H}{B_Y}}^{(Y+1)\frac{H}{B_Y}} \sum_{x=X\frac{W}{B_X}}^{(X+1)\frac{W}{B_X}} I_T(x,y)^2$$

$$D_{u,v}(X,Y) = \sum_{y=Y\frac{H}{B_Y}}^{(Y+1)\frac{H}{B_Y}} \sum_{x=X\frac{W}{B_X}}^{(X+1)\frac{W}{B_X}} I_D(x+u, y+v)^2$$

$$E(T) = \frac{1}{WH} \sum_{y=0}^{H} \sum_{x=0}^{W} I_T(x,y)^2$$

$$E(D_{u,v}) = \frac{1}{WH} \sum_{y=0}^{H} \sum_{x=0}^{W} I_D(x+u, y+v)^2$$

(i) comparing the similarity calculated in operation (h) by the similarity calculation module with the reference similarity, setting the comparison reference pixel as a point of interest when the similarity is greater than the reference similarity, and updating a position of a next pixel adjacent to the comparison reference pixel as the comparison reference pixel, by a similarity determination module, (j) comparing the similarity calculated in operation (h) by the similarity calculation module with the reference similarity, and updating a position of a pixel spaced apart from the comparison reference pixel by the reference skip distance as the comparison reference pixel when the similarity is less than the reference similarity, by a similarity determination module, (k) repeating operations (f) to (j) for the comparison reference pixel updated in operation (i) or (j), and (l) performing a similarity calculation of Equation 1 in units of regions or pixels having a size smaller than that of the region obtained in operations (c) and (f) within a distance range that is set by the detailed search criteria around the point of interest set in operation (i), and determining a pixel having the largest similarity around the point of interest as a position of a pattern of the template image, by a position determination module.

According to an aspect of the present disclosure, there is provided a pattern image detection apparatus, in which a template image is compared with a target image and a pattern included in the template image is searched for from the target image, including a receiving module configured to receive the template image and the target image and receive a reference similarity that is a criterion for determining whether there is a similarity, a reference skip distance that defines a distance to a next comparison reference pixel in the target image, and a detailed search criteria that defines a range in which a detailed search is performed in the target image, a template region module configured to divide the template image into a plurality of regions having the same size and sum a square of a brightness value of each of pixels in each region of the template image and setting the sum as a brightness value for each region, a target region module configured to select a comparison reference pixel of the target image, select a comparison target area having the same size as the template image on the basis of the comparison reference pixel of the target image and divide the comparison target area into a plurality of regions having the same size as the regions of the template image, and sum a square of a brightness value of each of pixels in each region of the comparison target area of the target image and set the sum as a brightness value for each region, a similarity calculation module configured to perform a normalized cross-correlation calculation according to Equation 1 in units of regions on the brightness value for each region of the template image and the comparison target area of the target image to calculate a similarity between the template image and the comparison target area, $$R(u, v) = \frac{\sum_{Y=0}^{B_Y-1} \sum_{X=0}^{B_X-1} (T(X, Y) - E(T))(D_{u,v}(X, Y) - E(D_{u,v}))}{\sqrt{\sum_{Y=0}^{B_Y-1} \sum_{X=0}^{B_X-1} (T(X, Y) - E(T))^2} \sqrt{\sum_{Y=0}^{B_Y-1} \sum_{X=0}^{B_X-1} (D_{u,v}(X, Y) - E(D_{u,v}))^2}}$$ [Equation 1]

where, u: a position of the target image in a horizontal axis, v: a position of the target image in a vertical axis, X: a position of a region of the template image in the horizontal axis, Y: a position of a region of the template image in the vertical axis, W: a horizontal length of the template image, H: a vertical length of the template image, $B_X$: the number of regions of the template image in the horizontal axis, $B_Y$: the number of regions of the template image in the vertical axis, T: the entire region of the template image, $D_{u,v}$: the entire comparison region of the target image, $I_T(x,y)$: a brightness value of an x, y position of the template image, $I_D(x,y)$: a brightness value of an x, y position of the target image, $$T(X, Y) = \sum_{y=Y\frac{H}{B_Y}}^{(Y+1)\frac{H}{B_Y}} \sum_{x=X\frac{W}{B_X}}^{(X+1)\frac{W}{B_X}} I_T(x, y)^2$$

$$D_{u,v}(X, Y) = \sum_{y=Y\frac{H}{B_Y}}^{(Y+1)\frac{H}{B_Y}} \sum_{x=X\frac{W}{B_X}}^{(X+1)\frac{W}{B_X}} I_D(x+u, y+v)^2$$

$$E(T) = \frac{1}{WH} \sum_{y=0}^{H} \sum_{x=0}^{W} I_T(x, y)^2$$

$$E(D_{u,v}) = \frac{1}{WH} \sum_{y=0}^{H} \sum_{x=0}^{W} I_D(x+u, y+v)^2$$

a similarity determination module configured to compare the similarity calculated by the similarity calculation module with the reference similarity, set the comparison reference pixel as a point of interest when the similarity is greater than the reference similarity, update a position of a next pixel adjacent to the comparison reference pixel as the comparison reference pixel, and update a position of a pixel spaced apart from the comparison reference pixel by the reference skip distance as the comparison reference pixel when the similarity is less than the reference similarity to operate the target region module and the similarity calculation module for the comparison reference pixel, and a position determination module configured to perform a similarity calculation of Equation 1 in units of regions or pixels having a size smaller than that of the region divided by the template region module and the target region module within a distance range that is set by the detailed search criteria around the point of interest set by the similarity determination module and determine a pixel having the largest similarity around the point of interest as a position of a pattern of the template image.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 3A to 8C are views for describing the process of implementing the pattern image detection method using the pattern image detection apparatus illustrated in FIG. 1.

DETAILED DESCRIPTION

Embodiments of the present disclosure provide a method and apparatus for detecting a pattern image capable of quickly detecting a pattern of a template image from a target image while finding a position of the pattern accurately with low computation cost by reducing the amount of computation as much as possible.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein.

Hereinafter, a pattern image detection apparatus according to an embodiment of the present disclosure will be described with reference to the accompanying drawings.

Figure 1:
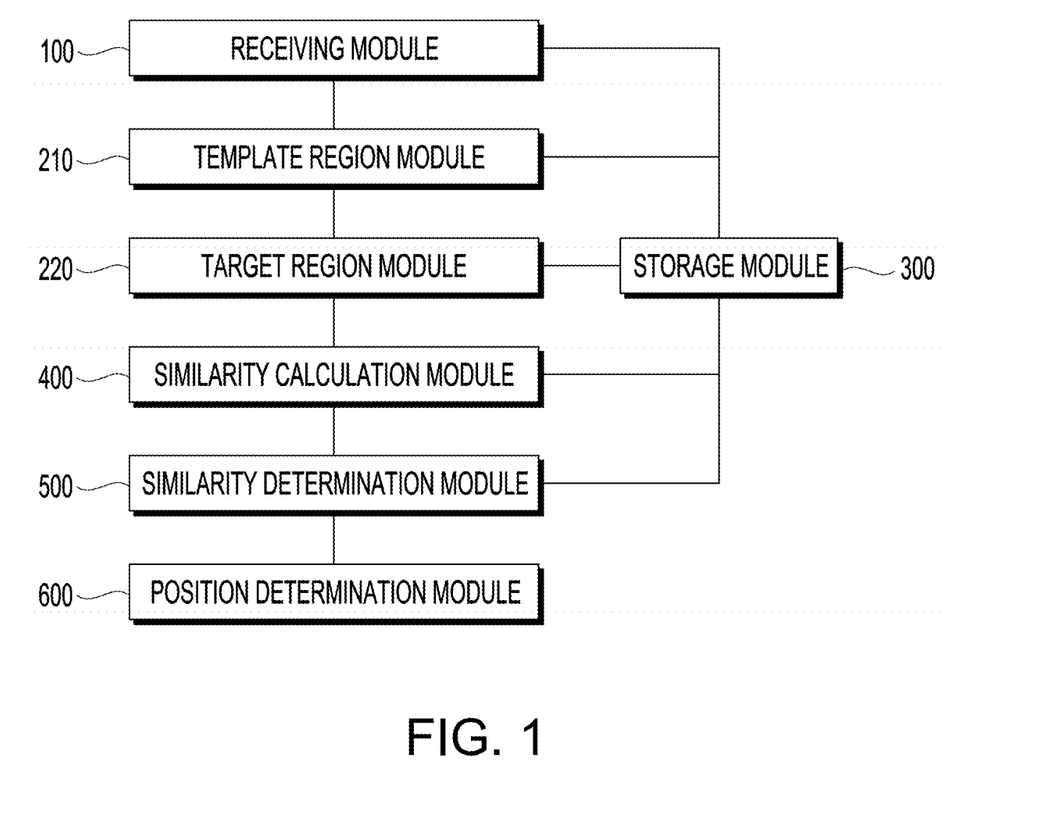
FIG. 1 is a block diagram of a pattern image detection apparatus according to an embodiment of the present disclosure.
Figure 2:
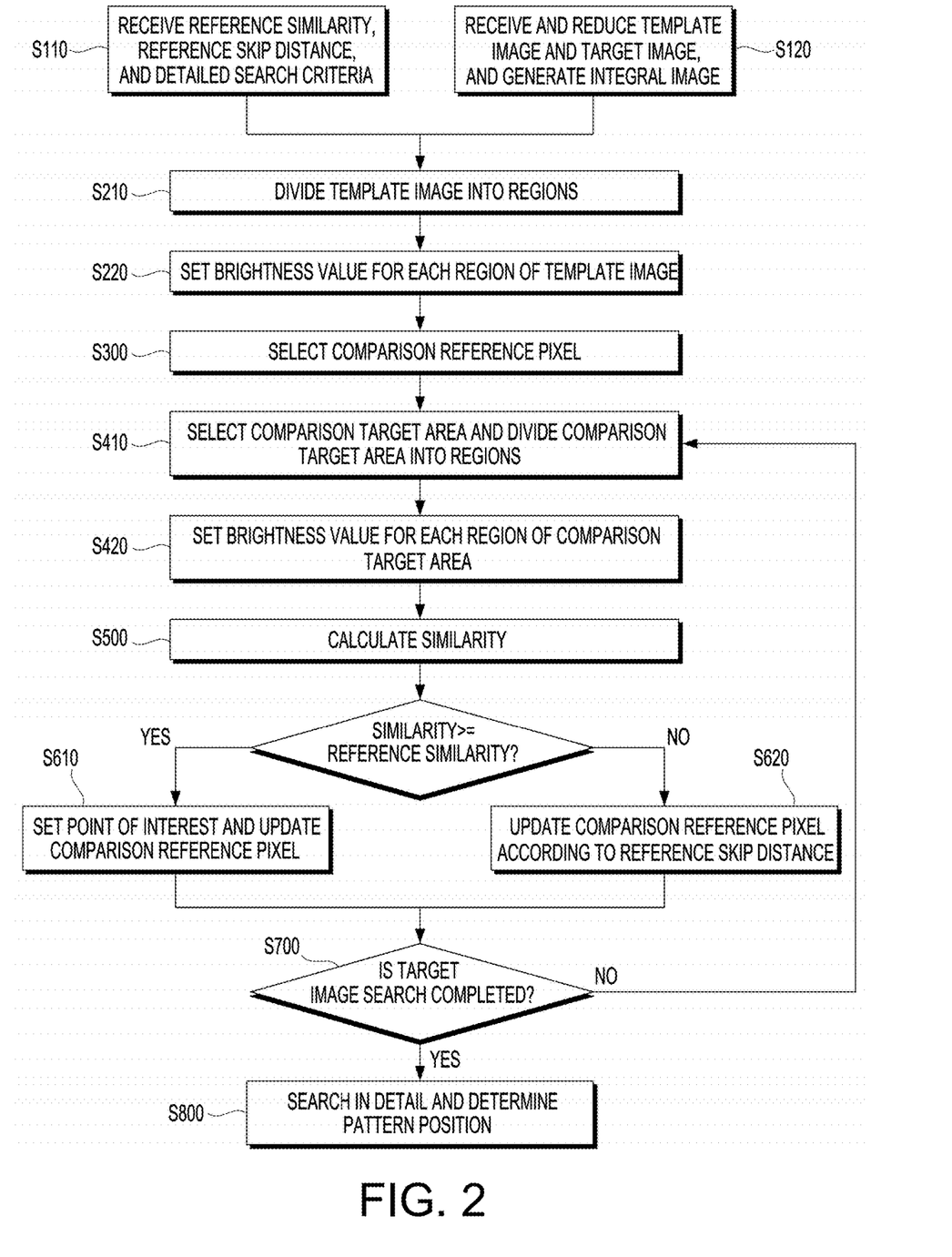
FIG. 2 is a flowchart illustrating a process of implementing a pattern image detection method using the pattern image detection apparatus illustrated in FIG. 1.

FIG. 1 is a block diagram of a pattern image detection apparatus according to an embodiment of the present disclosure, and FIG. 2 is a flowchart for implementing a pattern image detection method of the present disclosure using the pattern image detection apparatus illustrated in FIG. 1.

Referring to FIG. 1, the pattern image detection apparatus of the present embodiment includes a receiving module 100, a template region module 210, a target region module 220, a similarity calculation module 400, a similarity determination module 500, and a position determination module 600.

Figure 3A:
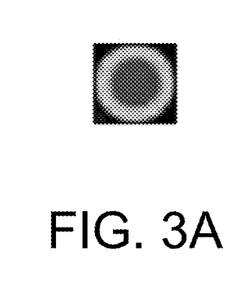
Figure 3B:
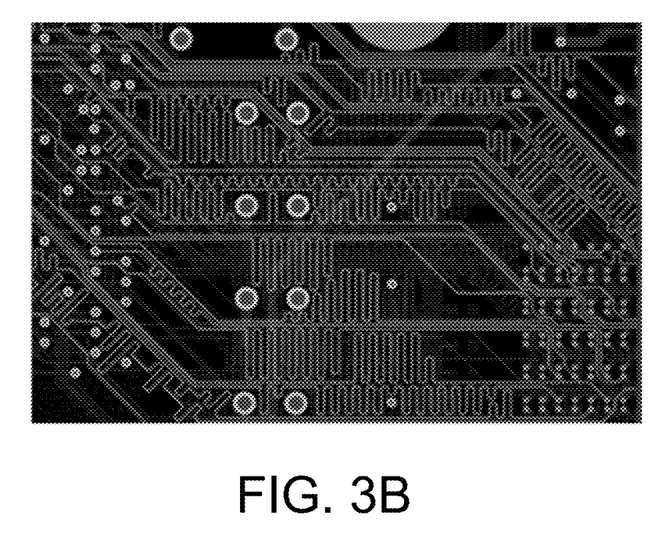

The receiving module 100 receives a template image and a target image and stores the template image and the target image in a storage module 300. The template image is an image to be searched for from the target image. FIG. 3A illustrates an example of the template image. In the case of the present embodiment, the receiving module 100 receives the template image of a form in which a circular pattern is photographed as shown in FIG. 3A. The target image is a target for which a pattern of the template image is to be searched. In the case of the present embodiment, the pattern of the template image, which has a shape as shown in FIG. 3B, is searched for from the target image.

The receiving module 100 further receives a reference reduction ratio, a reference similarity, a reference skip distance, and detailed search criteria, and stores the received reference reduction ratio, reference similarity, reference skip distance, and detailed search criteria in the storage module 300.

Figure 4A:
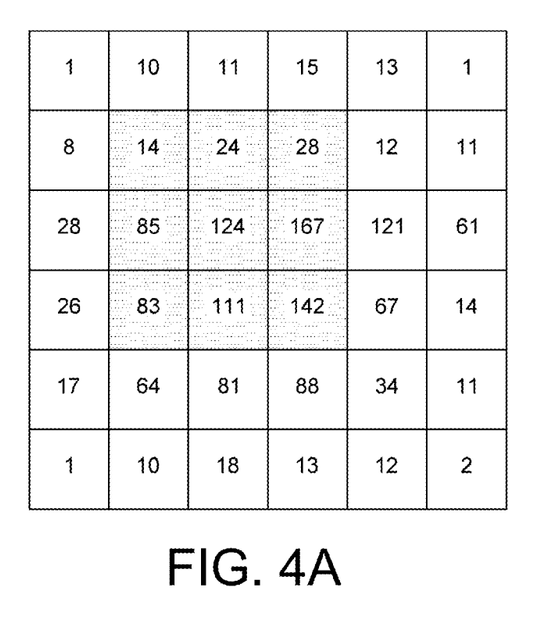
Figure 4B:
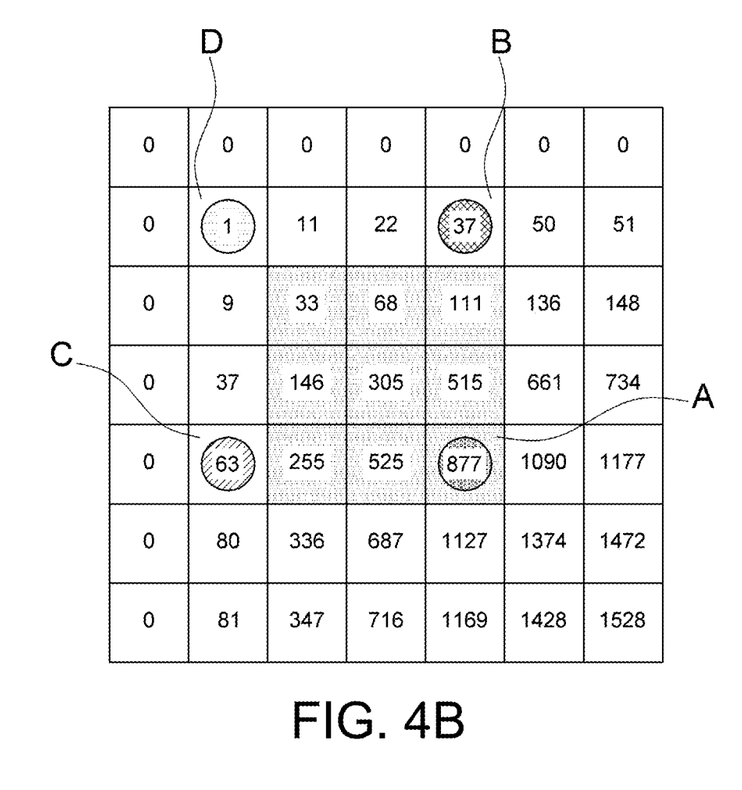

In the case of the present embodiment, the receiving module 100 uses the template image and the target image by converting them into the form of an integral image as shown in FIG. 4A and FIG. 4B. The integral image is an image converted by a method of assigning values, which are obtained by adding all brightness values of previous pixels, to values of next pixels. FIG. 4A illustrates a brightness value for each pixel of an original image. FIG. 4B illustrates a brightness value for each pixel obtained by converting the original image into an integral image.

Such an integral image is used to easily calculate the sum of pixel values in a specific region of the image. In FIG. 4A, the sum of values of 3×3 pixels indicated by a shade box may be easily and quickly calculated by only four computations. That is, in FIG. 4B, when the computation is performed using a formula of A−B−C+D, the sum of values of 9 pixels displayed in shade may be easily calculated. As the number of pixels included in an area increases, the effect of calculating the sum of pixel values in the area due to the integral image increases.

In the present embodiment, the template image and the target image in the form of an integral image are used so that the similarity determination module and the position determination module 600, which will be described below, may rapidly perform a cross-correlation calculation normalized by Equation 1 for each region unit.

Figure 5A:
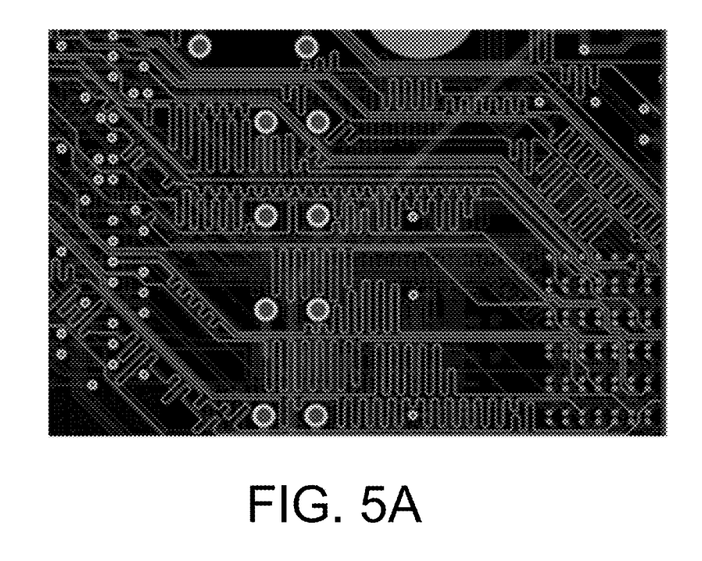
Figure 5B:
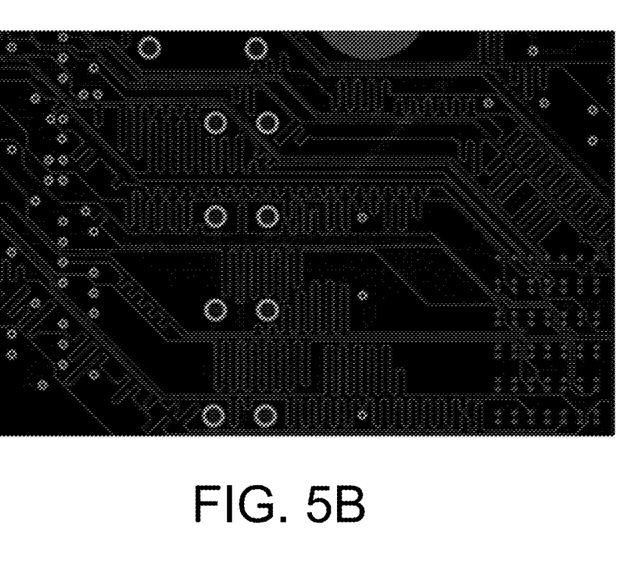
Figure 8A:
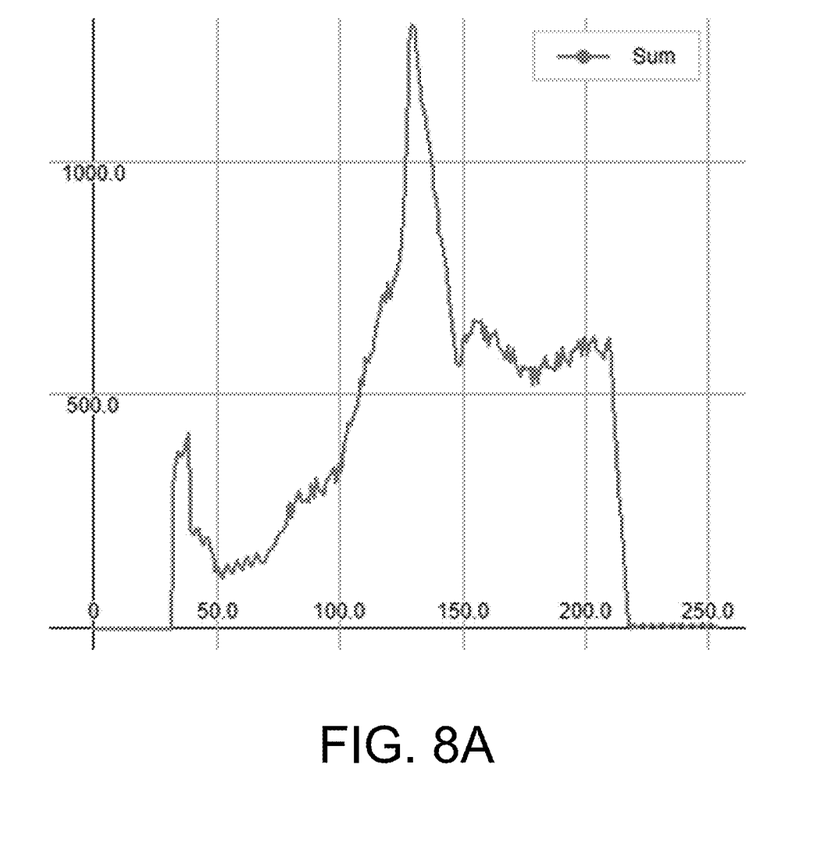
Figure 8B:
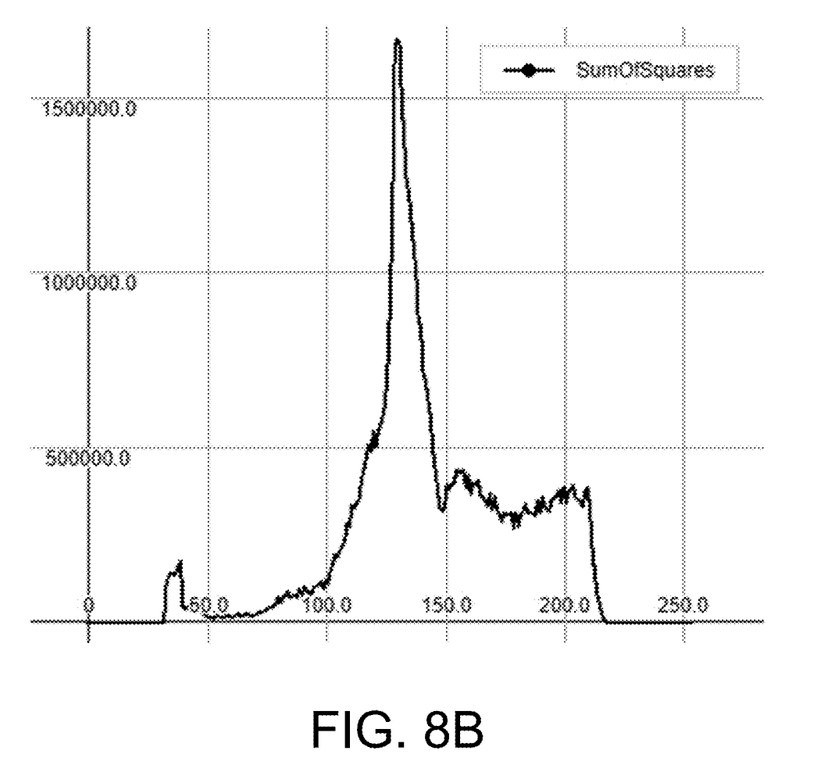
Figure 8C:
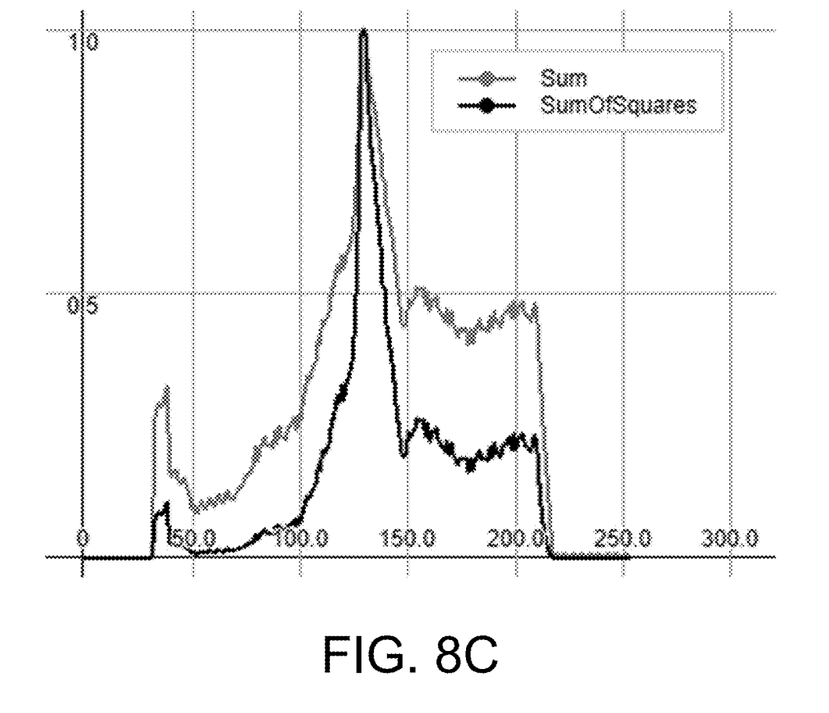

In the case of the present disclosure, in order to improve the speed and accuracy of a pattern search by changing a difference between adjacent pixels of each of the template image and the target image into a distribution, which is maximized in the pattern, the receiving module 100 uses the template image and the target image by squaring a brightness value of each of the pixels of the template image and the target image and then converting each of the template image and the target image into the form of an integral image. By maximizing the difference in information power between a pattern and a non-pattern, information weight on the pattern is relatively increased, and thus a strong relationship may be reflected. Even when information weight on a non-patterned portion is reduced, the loss of an information value of the pixel itself does not occur, so that weak relationships of non-patterns are reflected without an information loss. FIG. 5A and FIG. 5B illustrate examples of an original image and an image to which a pattern distribution maximized by squaring a brightness value is applied. FIG. 5A illustrates an original of the target image. FIG. 5B illustrates a target image converted by squaring each brightness value of the origin image. FIG. 8A to FIG. 8C illustrate a difference in pattern distribution depending on whether a brightness value of a pixel is squared. FIG. 8A illustrates brightness values of pixels of an arbitrary horizontal row in the original image. FIG. 8B illustrates a distribution of the square of the brightness value of each pixel shown in FIG. 8A. In FIG. 8C, the distribution of each of FIG. 8A and FIG. 8B is compared on the same scale and illustrated.

In each diagram of FIG. 8A to FIG. 8C, a horizontal axis indicates pixels in an arbitrary row (may also be a column) of the template image and a vertical axis indicates the brightness value or the square of the brightness value of the corresponding pixel. Referring to FIGS. 8A to 8C, the pattern of the template image appears as a difference in brightness of the pixels. When FIG. 8A is compared with FIG. 8B, it can be seen that a difference between values corresponding to each of the pixels is maximized in the case of FIG. 8A that is obtained by squaring the brightness value. That is, it can be seen that the pattern is mathematically more clearly distinguished by squaring the brightness value. When the brightness value corresponding to the pixel of FIG. 8A and the maximum value of the square of the brightness value of FIG. 8B are depicted on the same scale as shown in FIG. 8C, it can be seen that a change in the pattern is maximized due to a non-linear difference in brightness by the square computation rather than a linear difference that simply increases or decreases along the y-axis.

The reference similarity is a value that serves as a criterion for determining a result calculated by a cross-correlation calculation equation, which will be described below, as similar or dissimilar.

The reference skip distance is a predetermined value of a distance from a position of the pixel determined to be dissimilar to a position of the next pixel determined to be similar in the target image. When a specific pixel of the target image is determined to be dissimilar as a result of determining whether the specific pixel is similar to the template image, the pattern image detection apparatus of the present disclosure moves by as much as the reference skip distance from the previous reference pixel and determines whether there is a pattern similar to the pattern of the template image. The reference skip distance may be specified by the number of pixels, or may be specified by an appropriate ratio for the width or height of the template image.

The detailed search criteria correspond to values that define the range of an area, in which a detailed search is to be performed, to find the position of the pixel most similar to the template image from the pixels determined to be similar in the target image. The detailed search criteria may be specified by the number of pixels, or may be specified by an appropriate ratio of the width or height of the template image. For example, the detailed search criteria may be specified so that the detailed search is performed within 20 pixels above, below, left, and right of the specific pixel of the target image, which is determined to be similar to the template image, or in a range of 1/32 of the width of the template image.

Figure 6A:
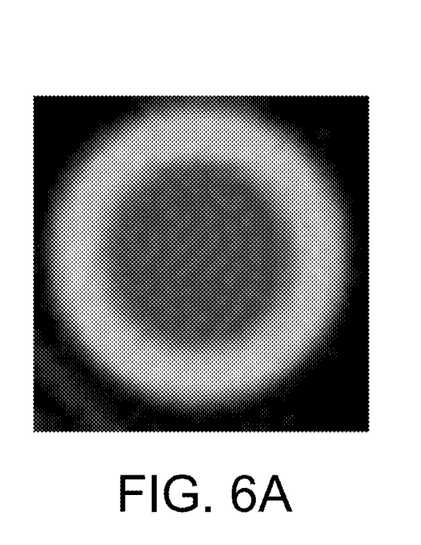
Figure 6B:
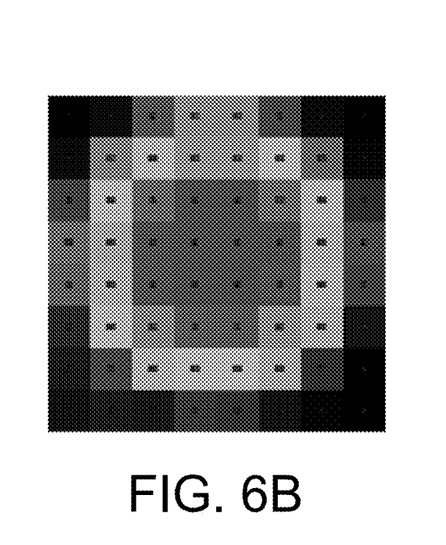

The template region module 210 divides the template image into a plurality of regions of the same size. In addition, the template region module 210 sums the square of the brightness value of each of the pixels in each region of the template image and sets the sum as a brightness value for each region. For example, the template region module 210 may divide the template image into a total of 64 regions by dividing the template image into 8 equal parts horizontally and vertically as shown in FIG. 6B. The template region module 210 sums the square of the brightness value of each of the pixels belonging to each of the regions equally divided as described above and sets the sum as the brightness value for each region. FIG. 6A illustrates an original image of the template image. FIG. 6B is a view obtained by dividing the original image into 64 regions by the template region module 210, and equally applying the brightness value set in each region to the pixels belonging to the region.

When the template region module 210 converts the template image into an image in units of regions by such a method, the resolution of the template image may be lowered, but the speed of searching for a pattern of the template image from the target image may be improved. In addition, since the brightness value of the region is specified by summing the square of the brightness value of each of the pixels belonging to the region of the template image, the brightness value of the region includes pieces of information of the pixels in the region. Accordingly, in the present disclosure, the accuracy of searching for the template image from the target image may be maintained at a high level by using the pieces of information of the pixels included in each region.

The number of regions into which the template image is divided by the template region module 210 may be pre-specified or may be selected as an appropriate value in consideration of the size of the template image.

As described above, since each of the template image and the target image is converted into the form of an integral image by the receiving module 100, the template region module and the target region module 220 may easily and quickly calculate the sum of the square of the brightness for each region with a simple computation by using the integral image.

The target region module 220 selects an area to be compared with the template image from the target image and divides the area into a plurality of regions, each of which has a size same as the template image. The target region module 220 selects a pixel that becomes a reference of the position of the target image, which is to be compared with the template image, as a comparison reference pixel. The target region module 220 selects a comparison target area, which has the same size as the template image, on the basis of the selected comparison reference pixel, and divides the comparison target area into a plurality of regions having the same size as the regions of the template image. In addition, similarly to the manner performed for the regions of the template image by the template region module 210, the target region module 220 sums the square of the brightness value of each of the pixels for each region in the comparison target area of the target image and sets the sum as a brightness value for each region. As described above, the brightness value for each region of the target image may be easily and quickly calculated by using the integral image.

The similarity calculation module 400 calculates a similarity between the template image and the comparison target area of the target image. The similarity calculation module 400 calculates the similarity between the template image and the comparison target area by performing a normalized cross-correlation calculation according to Equation 1 on the brightness value for each region of the template image and the comparison target area in units of regions, $$R(u, v) = \frac{\sum_{Y=0}^{B_Y-1} \sum_{X=0}^{B_X-1} (T(X, Y) - E(T))(D_{u,v}(X, Y) - E(D_{u,v}))}{\sqrt{\sum_{Y=0}^{B_Y-1} \sum_{X=0}^{B_X-1} (T(X, Y) - E(T))^2} \sqrt{\sum_{Y=0}^{B_Y-1} \sum_{X=0}^{B_X-1} (D_{u,v}(X, Y) - E(D_{u,v}))^2}}$$ [Equation 1]

where, u: a position of the target image in a horizontal axis, v: a position of the target image in a vertical axis, X: a position of a region of the template image in the horizontal axis, Y: a position of a region of the template image in the vertical axis, W: a horizontal length of the template image, H: a vertical length of the template image, $B_X$: the number of regions of the template image in the horizontal axis, $B_Y$: the number of regions of the template image in the vertical axis, T: the entire region of the template image, $D_{u,v}$: the entire comparison region of the target image, $I_T(x,y)$: a brightness value of an x, y position of the template image, $I_D(x,y)$: a brightness value of an x, y position of the target image, $$T(X, Y) = \sum_{y=Y\frac{H}{B_Y}}^{(Y+1)\frac{H}{B_Y}} \sum_{x=X\frac{W}{B_X}}^{(X+1)\frac{W}{B_X}} I_T(x, y)^2$$

$$D_{u,v}(X, Y) = \sum_{y=Y\frac{H}{B_Y}}^{(Y+1)\frac{H}{B_Y}} \sum_{x=X\frac{W}{B_X}}^{(X+1)\frac{W}{B_X}} I_D(x+u, y+v)^2$$

$$E(T) = \frac{1}{WH} \sum_{y=0}^{H} \sum_{x=0}^{W} I_T(x, y)^2$$

$$E(D_{u,v}) = \frac{1}{WH} \sum_{y=0}^{H} \sum_{x=0}^{W} I_D(x+u, y+v)^2$$

The similarity calculation module 400 quantifies and calculates a similarity in brightness distribution between the template image and the comparison target area by Equation 1. The normalized cross-correlation calculation equation has a result value between −1 and 1. As the result value of Equation (1) is close to 1, it means that a numerical similarity is high and the distributions are equal to each other. In addition, even when the brightness distributions are similar to each other but there is a difference in the pixel values due to the brightness difference, since normalization is performed, it can be confirmed from Equation (1) that the numerical similarity is robust even in brightness variation.

The similarity determination module 500 specifies a next comparison target area in the target image on the basis of the similarity calculated by the similarity calculation module 400, and operates the target region module 220 and the similarity calculation module 400 for a position of the next comparison target area.

The similarity determination module 500 determines whether the comparison target area is similar to the template image by using the similarity calculated by the similarity calculation module 400. The similarity determination module 500 determines whether there is a similarity by comparing the reference similarity received by the receiving module 100 with the similarity calculated by the similarity calculation module 400.

When the similarity calculated by the similarity determination module 500 is greater than the reference similarity, the similarity determination module 500 determines that the comparison target area is similar to the template image. The similarity determination module 500 sets the comparison reference pixel as a point of interest and updates a position of the next pixel adjacent to the comparison reference pixel as a new comparison reference pixel and performs similarity determination again on the basis of the position.

When the similarity calculated by the similarity determination module 500 is less than the reference similarity, the similarity determination module 500 determines that the comparison target area is not similar to the template image. The similarity determination module 500 updates a position of the pixel spaced apart from the comparison reference pixel by the reference skip distance with the new comparison reference pixel and performs the similarity determination again on the basis of the updated position.

The reference skip distance received by the receiving module 100 may be specified in various ways. In the case of the present embodiment, the receiving module 100 receives and uses the reference skip distance according to the criteria shown in Table 1.

TABLE 1

Reference skip distance

| Range of calculated similarity values | Reference skip distance |
|---|---|
| Similarity $< \left(\dfrac{S^4}{16}\right)$ | ⅛ Width or ⅛ Height |
| Similarity $< \left(\dfrac{S^2}{4}\right)$ | 1/16 Width or 1/16 Height |
| Similarity $< \left(\dfrac{S}{2}\right)$ | 1/32 Width or 1/32 Height |
| Similarity $< \left(\dfrac{4S}{5}\right)$ | One or two pixels |
| Similarity $< \left(\dfrac{9S}{10}\right)$ | one pixel | where s: a reference similarity, Width: a width of the template image, Height: a height of the template image.

As shown in the table above, the receiving module 100 receives the reference skip distance set to have a value that varies according to the numerical range of the similarity calculated by the similarity calculation module 400. The similarity determination module 500 determines a pixel at a position spaced apart by the reference skip distance according to the range corresponding to the calculated similarity as a new comparison reference pixel.

As shown in Table 1 above, it is preferable that the reference skip distance is set to be greater as the similarity value is smaller. By setting the reference skip distance in this manner, at a position in which the similarity is low, the similarity calculation is performed again by moving to the next pixel at a relatively far position, and at a position in which the similarity is high, the similarity calculation is performed again by moving to the next pixel at a relatively close position. By setting the reference skip distance in this manner, the amount of unnecessary computation for the pattern search may be reduced and a search speed may be improved.

The reference skip distance may be set in various ways without being limited to the values shown in Table 1.

The position determination module 600 performs similarity calculation of Equation 1 in more detail on the point of interest set by the similarity determination module 500 within a distance range set by the detailed search criteria and determines a pixel having the highest similarity as the position of the pattern of the template image. The position determination module 600 determines an area, which is to be searched for, around the point of interest by the detailed search criteria. The detailed search criteria received by the receiving module 100 may be specified by the number of pixels as described above, or may be specified by a ratio of the width or height of the template image. For example, when the detailed search criteria are specified by 20 pixels, the position determination module 600 performs the similarity calculation of Equation 1 for all pixels in a range of 20 pixels up, down, left, and right about the point of interest. In this case, the position determination module 600 performs the similarity calculation of Equation 1 by dividing each of the template image and the target image into regions that are smaller in number than the regions previously generated by dividing each of the template image and the target image by the template region module 210 and the target region module 220 for the similarity calculation module 400. In some cases, the position determination module 600 may perform the similarity calculation of Equation 1 in units of pixels without dividing each of the template image and the target image into regions.

Accordingly, in the detailed search operation, the position determination module 600 may compare the template image and the target image more specifically and accurately than the similarity calculation module 400. The position determination module 600 determines the pixel having the highest similarity as the result of calculating the similarity around the point of interest according to the detailed search criteria as the position of the pattern of the template image.

Figure 7:
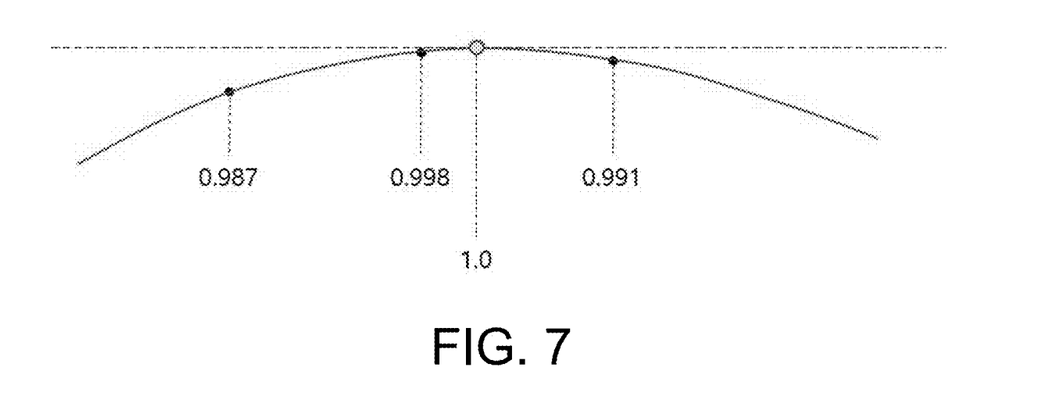

In some cases, the position determination module 600 may determine a more accurate position of the pattern of the template image using interpolation. When the similarity calculation according to Equation 1 is performed to calculate the similarity of the pixel having the greatest similarity among points of interest and the similarity of the adjacent pixel by interpolation, the position determination module 600 may estimate the position of the template image in units smaller than units of pixels. For example, as shown in FIG. 7, when similarities calculated from adjacent pixels are 0.987, 0.998, and 0.991, respectively, a position at which the similarity becomes 1.0 may be estimated from pixels having similarity values of 0.998 and 0.991 when a change in similarity according to the position is estimated by interpolation using a quadratic equation. With such a method, it is possible to estimate the position of the template image with an accuracy higher than the target image that is digitized in units of pixels.

Hereinafter, a process of performing a pattern image detection method of the present disclosure using the pattern image detection apparatus configured as described above will be described in detail.

First, the receiving module 100 receives a reference similarity, a reference skip distance, detailed search criteria, and a reference reduction ratio (operation (b): S110).

The reference skip distance may be defined as a value that varies according to a numerical range of similarity. In the case of the present embodiment, as described above, the reference skip distance is determined according to the criteria set forth in Table 1.

The reference similarity and the detailed search criteria may also be set to have values that vary according to a factor such as a size of a template image, a size of a target image, the needs of an accuracy, the needs of a computation speed, and the like.

Separately from operation (b), the receiving module 100 receives the template image and the target image (operation (a); S120). FIG. 3A illustrates the template image used in the present embodiment, and FIG. 3B illustrates the target image.

The receiving module 100 generates an image obtained by converting each of the template image and the target image, which are reduced as described above, into the form of an integral image. That is, the receiving module 100 converts each of the template image and the target image into the integral image in a form in which a square of a brightness value of each pixel of the template image and the target image is accumulated and summed while proceeding in horizontal and vertical directions.

By using the square of the brightness value for each pixel, a pattern distribution of each of the template image and the target image is maximized, thereby improving the accuracy of pattern search. The receiving module 100 squares and uses the brightness value of each pixel of the template image and the target image, and also generates the integral image of each of the template image and the target image by using an image obtained by squaring the brightness value as described above. FIG. 5A illustrates the target image, and FIG. 5B illustrates the image obtained by squaring each pixel value of the target image.

The template region module 210 divides the template image into a plurality of regions having the same size (operation (c); S210). In the case of the present embodiment, the template region module 210 divides the template image into a total of 64 regions by dividing the template image into 8 equal parts horizontally and vertically. When necessary, the template region module 210 may divide the template image into various different values.

The template region module 210 sums the square of the brightness value of each of the pixels in each region of the template image divided as described above, and sets the sum as a brightness value for each region (operation (d); S220). FIG. 6A illustrates an original of the template image, and FIG. 6B illustrates the template image in a form of being divided into 64 regions and summing the square of the brightness value for each region.

In this case, the template region module calculates the sum of the square of the brightness value for each region by using the integral image of the template image converted by the receiving module 100 in operation (a). As described above with reference to FIG. 4A and FIG. 4B, by using the integral image, the sum of the square of the brightness value for each region of the template image may be very quickly calculated.

Next, the target region module 220 selects a comparison reference pixel of the target image (operation (e); S300). In the case of the present embodiment, the target region module 220 selects an upper-leftmost pixel of the target image as the comparison reference pixel to be compared first. The comparison reference pixel basically moves to the right as the comparison with the template image progresses, and when all the comparisons for the pixels in one row are completed, the comparison is performed by moving to the pixels in the next row. However, the position of the comparison reference pixel, which is the target of the next comparison, may be set by skipping a plurality of pixels by the operation of the similarity determination module 500 to be described below.

The target region module 220 selects a comparison target area having the same size as the template image on the basis of the comparison reference pixel of the target image, and divides the comparison target area into a plurality of regions having the same size as those of the template image (operation (f); S410).

Next, the target region module 220 sums the square of the brightness value of each of the pixels in each region of the comparison target area of the target image and sets the sum as a brightness value for each region (operation (g); S420). In the same manner as in operation (d), in operation (g), the target region module 220 calculates the sum of the square of the brightness value for each region by using the integral image of the target image. As such, by using the integral image, the sum of the square of the brightness value for each region of the target image may be very quickly calculated.

As described above, when the sum of the square of the brightness value for each region of each the template image and the target image is calculated, the similarity calculation module 400 calculates a similarity between the template image and the comparison target area by performing a normalized cross-correlation calculation according to Equation 1 in units of regions for the template image and the comparison target area of the target image (operation (h); S500).

The similarity determination module 500 determines whether the template image and the comparison target area are similar to each other on the basis of the calculation value of the similarity calculation module 400, and then determines a position of the next comparison reference pixel.

The similarity determination module 500 compares the similarity calculated in operation (h) by the similarity calculation module 400 with the reference similarity, sets the comparison reference pixel as a point of interest when the similarity is greater than the reference similarity, and updates the position of the next pixel adjacent to the current comparison reference pixel as a new comparison reference pixel (operation (i); S610).

The similarity determination module 500 compares the similarity calculated in operation (h) by the similarity calculation module 400 with the reference similarity, and updates a position of the pixel spaced apart from the current comparison reference pixel by the reference skip distance as a new comparison reference pixel when the similarity is less than the reference similarity (operation (j); S620).

In the case of the present embodiment, as described above, the reference skip distance is determined as a range of similarity dependent on the value of the reference similarity as shown in Table 1, and the similarity determination module 500 sets a new comparison reference pixel by skipping pixels by as much as the reference skip distance determined according to Table 1. As a similarity value is smaller, the reference skip distance is set to be great, and as the similarity value is larger, the reference skip distance is set to be small. Accordingly, at a point in which the similarity of the target image is low, the comparison is performed on the next comparison target area by skipping many pixels, and at a point in which the similarity of the target image is high, a precise comparison is performed, so that the exact position of the template image is searched for from the target image. In this way, in the present disclosure, the search speed may be improved while maintaining high accuracy since the area in which the similarity is low is quickly skipped, and only the area in which the similarity is high is checked in detail.

Since the similarity calculation is performed in a state of including information of each pixel in the region by performing the similarity calculation in units of regions, when the calculated similarity value is low, it may be seen that a pattern similar to the template image does not exist around the region. Accordingly, as the similarity is lower, even when more pixels are skipped, there is no possibility of missing the pattern search of the template image from the target image.

As described above, when the position of the comparison reference pixel is updated in operations (i) and (j), by repeating operations (f) to (j) for a new comparison reference pixel, a similarity check is performed or skipped for all pixels of the target reference image (operation (k); S700).

When the process of performing or skipping the similarity check for all areas of the target reference image is completed, the position determination module 600 performs the similarity calculation according to Equation 1 in units of regions or pixels having a size smaller than that of the region obtained in operations (c) and (f) within the distance range that is set by the detailed search criteria around the point of interest set in operation (i), and determines a pixel having the largest similarity around the point of interest as a position of the pattern of the template image (S800).

For example, when the similarity calculation is performed by dividing each of the template image and the comparison target area into 64 regions in operations (c) and (f) in operation (k), each of the template image and the comparison target area is divided into 256 regions, and a more detailed search is performed on the basis of the point of interest. As described above, the detailed search criteria may be specified by a range of 20 pixels, up, down, left, and right around the point of interest, or may be specified by a range of $1/32$ of the width of the template image around the point of interest. In addition to this method, the detailed search criteria may be set in various other methods.

It is possible to quickly and accurately search for a pattern similar to the template image from the target image without performing the normalized cross-correlation calculation on all pixels of the target image in units of pixels by the above-described method. By performing normalized cross-correlation calculation by summing the square of the brightness value in units of regions, information about the brightness distribution in the region may be indirectly utilized as described above so that the calculation speed and accuracy may be simultaneously achieved. In addition, by using the similarity calculation that reflects the distribution within the region, areas with low similarity may be quickly skipped so that unnecessary similarity calculations may be omitted, thereby improving the overall speed of pattern search in the template image.

That is, the pattern image detection apparatus and the pattern image detection method of the present disclosure are advantageous in that a non-similar portion is skipped according to a criterion, and the similarity search is performed on a similar portion in detail, thereby simultaneously achieving a calculation speed and accuracy.

In operation (l), the position determination module 600 may determine a more accurate position of the pattern in the template image by using interpolation. When the similarity calculation according to Equation 1 is performed to calculate the similarity of the pixel having the greatest similarity among points of interest and the similarity of the adjacent pixel by interpolation, the position determination module 600 may estimate the position of the template image in units smaller than units of pixels. For example, as shown in FIG. 7, when similarities calculated from adjacent pixels are 0.987, 0.998, and 0.991, respectively, a position at which the similarity becomes 1.0 may be estimated from pixels having similarity values of 0.998 and 0.991 when a change in similarity according to the position is estimated by interpolation using a quadratic equation. With such a method, it is possible to estimate the position of the template image with an accuracy higher than the target image that is digitized in units of pixels.

Although the present disclosure has been described above with reference to exemplary embodiments of the present disclosure, the scope of the present disclosure is not limited thereto.

For example, operations (b) to (k) may be repeated two or more times while gradually increasing the reference similarity value in operation (b). For example, the process may proceed to operation (k) with a reference similarity set to be 0.7, and then a point of interest may be set, and operations (b) to (k) may be performed by setting the reference similarity to 0.8 again in an area around the point of interest. Operations (b) to (k) are performed by setting the reference similarity to 0.9 again for an area around the point of interest selected through the above-described process to find the point of interest again with stricter criteria, and operation (l) may also be performed on the found point. That is, as described above, a similar area may be searched for while quickly skipping by using an area distribution, and a similarity check may be performed with higher criteria only for the area, so that a speed and accuracy may be simultaneously secured.

Further, although each of the template image and the target image are described as being converted into an integral image and used in a process of calculating the sum of the square of the brightness value for each region, in some cases, it is also possible to directly calculate and use the sum of the square of the brightness value for each region without generating the integral image.

Further, in the above, when the template image is converted into the integral image by a method of processing the pattern distribution that is maximized by squaring the brightness value of each pixel, it is possible to use a ratio of the square of the brightness value and a maximum value of 16-bit resolution as a weight value and multiplied by 255. For example, when a template image and a target image of 8-bit resolution are used, the template image and the target image are converted into 16-bit resolution images by squaring a brightness each thereof. In this case, there is a risk that the calculation speed may be lowered. In particular, in the process of converting each of the template image and the target image into the integral image, the amount of computation may be increased by two times. In this case, in order to prevent an increase in the amount of computation while using the pattern distribution, in which the difference in brightness is maximized by using the squaring process, as it is, the square of the brightness value may be normalized by using the ratio between the square of the brightness value and the maximum value of 16-bit resolution as a weight. By using the brightness value of 8-bit units, which is converted using a weight ratio between the square of the brightness of an 8-bit pixel and that of a 16-bit pixel, the accuracy of the similarity calculation may be improved while reducing the computation speed. In this way, the template image and the target image that are formed in 8-bit units while having a square value are converted into integral images, and then the similarity calculation is calculated in the same manner as described above.

The pattern image detection method and the pattern image detection apparatus of the present disclosure can provide the effect of quickly and accurately detecting the pattern of the template image from the target image while reducing the amount of computation for detecting the pattern of the template image.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A pattern image detection method in which a template image is compared with a target image and a pattern included in the template image is searched for from the target image, as to determine a location in the target image where a chip placement or other operations at the determined location is to be performed, the pattern image detection method comprising:
 (a) receiving the template image and the target image by a receiving module;
 (b) receiving a reference similarity that is a criterion for determining whether there is a similarity, a reference skip distance that defines a distance to a next comparison reference pixel in the target image, and detailed search criteria that defines a range in which a detailed search is performed in the target image, by the receiving module;
 (c) dividing the template image into a plurality of regions having the same size by a template region module;
 (d) summing a square of a brightness value of each of pixels in each region of the template image and setting the sum as a brightness value for each region, by the template region module;
 (e) selecting a comparison reference pixel of the target image by a target region module;
 (f) selecting a comparison target area having the same size as the template image on the basis of the comparison reference pixel of the target image and dividing the comparison target area into a plurality of regions having the same size as the regions of the template image, by the target region module;
 (g) summing a square of a brightness value of each of pixels in each region of the comparison target area of the target image and setting the sum as a brightness value for each region, by the target region module;
 (h) performing a normalized cross-correlation calculation according to Equation 1 in units of regions on the brightness value for each region of the template image and the comparison target area of the target image to calculate a similarity between the template image and the comparison target area, by a similarity calculation module;

$$R(u, v) = \frac{\sum_{Y=0}^{B_Y-1} \sum_{X=0}^{B_X-1} (T(X, Y) - E(T)) (D_{u,v}(X, Y) - E(D_{u,v}))}{\sqrt{\sum_{Y=0}^{B_Y-1} \sum_{X=0}^{B_X-1} (T(X, Y) - E(T))^2} \sqrt{\sum_{Y=0}^{B_Y-1} \sum_{X=0}^{B_X-1} (D_{u,v}(X, Y) - E(D_{u,v}))^2}}$$ [Equation 1]

where, u: a position of the target image in a horizontal axis, v: a position of the target image in a vertical axis, X: a position of a region of the template image in the horizontal axis, Y: a position of a region of the template image in the vertical axis, W: a horizontal length of the template image, H: a vertical length of the template image, $B_X$: the number of regions of the template image in the horizontal axis, $B_Y$: the number of regions of the template image in the vertical axis, T: the entire region of the template image, $D_{u,v}$: the entire comparison region of the target image, $I_T(x,y)$: a brightness value of an x, y position of the template image, $I_D(x,y)$: a brightness value of an x, y position of the target image, $$T(X, Y) = \sum_{y=Y\frac{H}{B_Y}}^{(Y+1)\frac{H}{B_Y}} \sum_{x=X\frac{W}{B_X}}^{(X+1)\frac{W}{B_X}} I_T(x, y)^2$$

$$D_{u,v}(X, Y) = \sum_{y=Y\frac{H}{B_Y}}^{(Y+1)\frac{H}{B_Y}} \sum_{x=X\frac{W}{B_X}}^{(X+1)\frac{W}{B_X}} I_D(x+u, y+v)^2$$

$$E(T) = \frac{1}{WH} \sum_{y=0}^{H} \sum_{x=0}^{W} I_T(x, y)^2$$

$$E(D_{u,v}) = \frac{1}{WH} \sum_{y=0}^{H} \sum_{x=0}^{W} I_D(x+u, y+v)^2$$

(i) comparing the similarity calculated in operation (h) by the similarity calculation module with the reference similarity, setting the comparison reference pixel as a point of interest when the similarity is greater than the reference similarity, and updating a position of a next pixel adjacent to the comparison reference pixel as the comparison reference pixel, by a similarity determination module;
 (j) comparing the similarity calculated in operation (h) by the similarity calculation module with the reference similarity, and updating a position of a pixel spaced apart from the comparison reference pixel by the reference skip distance as the comparison reference pixel when the similarity is less than the reference similarity, by the similarity determination module;
 (k) repeating operations (f) to (j) for the comparison reference pixel updated in operation (i) or (j); and
 (l) performing a similarity calculation of Equation 1 in units of regions or pixels having a size smaller than that of the region obtained in operations (c) and (f) within a distance range that is set by the detailed search criteria around the point of interest set in operation (i); and (m) identifying a pixel having the largest similarity around the point of interest from the target image, by a position determination module, wherein a position of the identified pixel in the target image is where the pattern to be searched for is located.

2. The pattern image detection method of claim 1, wherein
in operation (a), the receiving module squares the brightness value of each pixel of the template image and the target image, and then converts each of the template image and the target image into an integral image,
in operation (d), the sum of the square of a brightness value for each region is calculated by using the integral image of the template image generated in operation (a), and
in operation (g), the sum of the square of the brightness value for each region is calculated by using the integral image of the target image generated in operation (a).

3. The pattern image detection method of claim 1, wherein
in operation (a), the receiving module reduces the number of bits by using a brightness value of 8-bit units, which is converted using a weight ratio between the square of the brightness value of each pixel of the template image and the target image and a 16-bit resolution, and then converts each of the template image and the target image into the form of an integral image,
in operation (d), the sum of the square of a brightness value for each region is calculated by using the integral image of the template image generated in operation (a), and
in operation (g), the sum of the square of the brightness value for each region is calculated by using the integral image of the target image generated in operation (a).

4. The pattern image detection method of claim 1, wherein
in operation (b), the receiving module receives the reference skip distance that is set to have a value that varies according to a numerical range of a similarity to be calculated in operation (h) by the similarity calculation module, and
in operation (j), the comparison reference pixel is updated according to a value corresponding to the reference skip distance for each similarity range that is stored in the receiving module in operation (b).

5. The pattern image detection method of claim 2, wherein
in operation (b), the receiving module receives the reference skip distance that is set to have a value that varies according to a numerical range of a similarity to be calculated in operation (h) by the similarity calculation module, and
in operation (j), the comparison reference pixel is updated according to a value corresponding to the reference skip distance for each similarity range that is stored in the receiving module in operation (b).

6. The pattern image detection method of claim 3, wherein
in operation (b), the receiving module receives the reference skip distance that is set to have a value that varies according to a numerical range of a similarity to be calculated in operation (h) by the similarity calculation module, and
in operation (j), the comparison reference pixel is updated according to a value corresponding to the reference skip distance for each similarity range that is stored in the receiving module in operation (b).

7. The pattern image detection method of claim 4, wherein
in operation (b), as a value of the similarity is smaller, the reference skip distance received by the receiving module is set to be greater to correspond to the range of the value.

8. The pattern image detection method of claim 5, wherein
in operation (b), as a value of the similarity is smaller, the reference skip distance received by the receiving module is set to be greater to correspond to the range of the value.

9. The pattern image detection method of claim 6, wherein
in operation (b), as a value of the similarity is smaller, the reference skip distance received by the receiving module is set to be greater to correspond to the range of the value.

* * * * *